United States Patent [19]

Winfried et al.

[11] Patent Number: 5,001,177
[45] Date of Patent: Mar. 19, 1991

[54] BRANCHED THERMOPLASTIC POLYCARBONATES HAVING IMPROVED PROTECTION AGAINST UV LIGHT

[75] Inventors: Paul Winfried, Pittsburgh, Pa.; Hans-Josef Buysch, Krefeld, Fed. Rep. of Germany; Wolfgang Nising, Augustin, Fed. Rep. of Germany; Thomas Scholl, Meerbusch, Fed. Rep. of Germany

[73] Assignee: Bayer Aktiengesellschaft, Leverkusen, Fed. Rep. of Germany

[21] Appl. No.: 47,803

[22] Filed: May 8, 1987

[30] Foreign Application Priority Data

May 28, 1986 [DE] Fed. Rep. of Germany ....... 3617978

[51] Int. Cl.$^5$ .......................... C08K 5/34; C08K 5/48; C08L 27/12
[52] U.S. Cl. ...................................... 524/86; 524/91; 524/544
[58] Field of Search ............... 524/86, 544, 91

[56] References Cited

U.S. PATENT DOCUMENTS 3,525,712  8/1970  Kramer ................................. 260/47
3,544,514 12/1970  Schnell et al. ...................... 260/47
3,859,330 12/1975  Proskow ............................... 524/544
4,185,009  1/1980  Idel et al. ............................ 260/45.9

FOREIGN PATENT DOCUMENTS 1208873  8/1986  Canada .
146360  11/1972  Czechoslovakia .
1670951  2/1971  Fed. Rep. of Germany .
2832670  2/1980  Fed. Rep. of Germany .

OTHER PUBLICATIONS

Carl Hanser Verlag, Taschenbuch der Kunststoff-Additive, by Drs. Gachter and Muller, 1983, pg. 183 et seq.

Primary Examiner—John Kight, III
Assistant Examiner—P. Hampton-Hightower
Attorney, Agent, or Firm—Joseph C. Gil; Aron Preis

[57] ABSTRACT

This invention relates to branched thermoplastic polycarbonates containing hydroxybenzotriazoles corresponding to the following general formula (I):

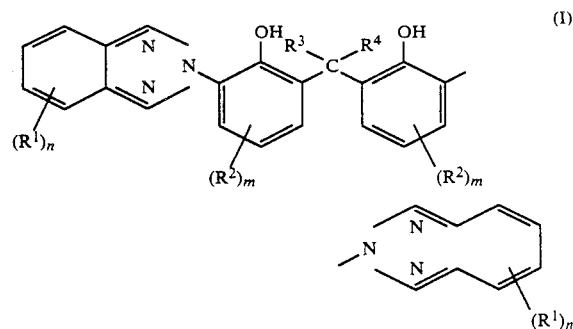

9 Claims, No Drawings

BRANCHED THERMOPLASTIC POLYCARBONATES HAVING IMPROVED PROTECTION AGAINST UV LIGHT

This invention relates to branched, thermoplastic polycarbonates, characterised in that they contain hydroxybenzotriazoles corresponding to the following general formula (I)

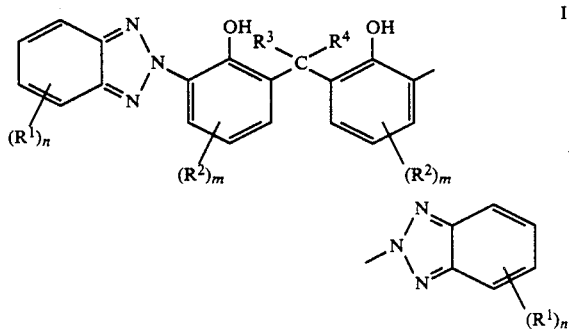

wherein $R^1$ and $R^2$, which may be the same or different, represent H, halogen, $C_1-C_{10}$ alkyl; $C_5-C_{10}$ cycloalkyl, $C_7-C_{13}$ aralkyl, $C_6-C_{14}$ aryl, $OR^5$ or $COOR^5$, wherein $R^5$ represents H or $C_1-C_4$ alkyl;

$R^3$ and $R^4$ may also be the same or different and represent H, $C_1-C_4$ alkyl, $C_5$ or $C_6$ cycloalkyl, benzyl or $C_6-C_{14}$ aryl;

m represents 1, 2 or 3 and n represents 1, 2, 3, or 4.

$R^1$ preferably represents H, Cl or $CH_3$ and $R^2$ preferably represents H, $C_1-C_{10}$ alkyl, cyclohexyl, $C_7-C_9$ aralkyl, phenyl or naphthyl. $R^3$ and $R^4$ preferably represent H or $C_1-C_4$ alkyl; m preferably represents 1, and n also preferably represents 1.

Particularly preferred compounds (I) are those wherein $R^1$ represents H; $R^2$ represents H or $C_1-C_9$ alkyl; $R^3$ represents H; $R^4$ represents H; m represents 1 and n represents 1.

Thermoplastic polycarbonates undergo degradation under conditions of weathering in the presence of air, moisture and light, especially UV light. This degradation is manifested by a deterioration in mechanical properties, such as impact strength, notched impact strength and maximum breaking strength under multiaxial stresses, and a general increase in brittleness.

It is known that aromatic polycarbonates may be protected against degrading influence of UV light when exposed to weathering by the addition of UV absorbents of the hydroxybenzotriazole type corresponding to the following general formula (II), e.g. (IIa) or (IIb):

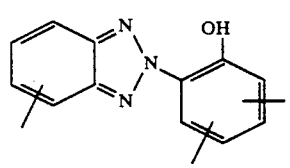

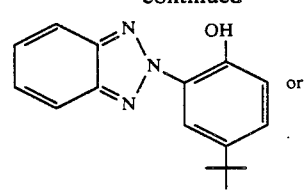

2-(2'-hydroxy-4'-t-octylphenyl)-benzotriazole

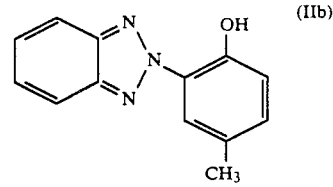

2-(2'hydroxy-4'-methylphenyl)-benzotriazole (See Taschenbuch der Kunststoffadditive by V.R. Gachter, and H. Muller, Carl Hanser Verlag Munich, Vienna, 1983, page 183 et seq).

It has been found that branched polycarbonates, which are very important for the production of large, dimensionally accurate parts by extrusion become brittle more rapidly than straight-chained carbonates if subjected to the same conditions in the presence of the same conventional hydroxytriazole UV absorbents. This is understandable since photochemical processes are influenced not only by molecular decompositions, but also by branching. Moreover, brittleness is caused not only by molecular degradation processes, but also by branching and cross-linking reactions, so that branched polycarbonate is basically biased towards earlier brittleness than the corresponding linear product.

It has now been found that benzotriazole derivatives (I) improve the protection of branched polycarbonates against UV light.

This is all the more surprising since the stabilizers (I) do not differ from commonly used representatives of this class of compound in the protective action thereof in linear polycarbonates.

There was therefore no reason to assume that there would be an advantage in replacing conventional benzotriazole UV absorbents by those corresponding to general formula (I).

Hydroxybenzotriazoles (I) are known and the preparation thereof has been described in DOS 1,670,951 and in Czechoslovakian Patent No. 146,360. Compared with hydroxybenzotriazoles (II), these compounds corresponding to general formula (I) are distinguished by the exceptionally high resistance thereof to sublimation and therefore low volatility at high temperatures.

Branched thermoplastic aromatic polycarbonates which are to be stabilized according to the present invention are those based on diphenols trifunctional or tetrafunctional or higher than tetrafunctional branching agents and conventional chain-breakers.

Diphenyls may contain alkyl- or halogen- substituents in the o- and/or m- position to the two phenolic OH groups.

The polycarbonates to be stabilized have average molecular weights Mw of from 10,000 to 100,000, preferably from 20,000 to 40,000 determined by measurement of relative viscosity in $CH_2Cl_2$ at 25° C. and a concentration of 0.5% by weight. The following are examples of suitable diphenols: hydroquinone resorcinol 4 4'-dihydroxy-diphenyl bis-(hydroxyphenyl)-alkanes, such as $C_1$–$C_8$ alkylene- or $C_2$–$C_8$ alkylidene-bisphenols, bis-(hydroxyphenyl)-cycloalkanes, such as $C_5$–$C_{15}$ cycloalkylene- or $C_5$–$C_{15}$ cycloalkylidenebisphenols, and bis-(hydroxyphenyl)-sulphides, -ethers -ketones, -sulphoxides or -sulphones; also, $\alpha,\alpha'$-bis-(hydroxy-phenyl-diisopropybenzene and the corresponding compounds which are alkylated or halogenated in the nucleus. The following are preferred: polycarbonates based on bis-(4-hydroxyphenyl)-propane-(2,2) (bisphenol A), bis-(4-hydroxy-3,5-dichlorophenyl)-propane-(2,2) (tetrachlorobisphenol A), bis-(4-hydroxy-3,5-dibromophenyl)-propane-(2,2) (tetrabromobisphenol A), bis-(4-hydroxy-3,5-dimethylphenyl)-propane (2,2) (tetramethylbisphenol A), bis-(4-hydroxyphenyl)-cyclohexane-(1,1) (bisphenol Z), bis-(4-hydroxy-3,5-dimethyl-phenyl)-sulphone (dixylenosulphone), and on trinuclear bisphenol, such as $\alpha,\alpha'$-bis-hydroxyphenyl-p-diisopropylbenzene, and mixtures of these compounds.

Other bisphenols suitable for the preparation of branched polycarbonates are described in U.S. Pat. Nos. 3,028,365; 2,999,835; 3,148,172; 2,290,131; 2,991,273; 3,271,367; and 2,999,846.

Suitable branching agents are those containing 3, 4 or more functional groups in particular those having 3 or more phenolic hydroxyl groups. The quantities in which these are used should be kept within the limits normally observed for branching agents, of from 0.05 to 2 mole-% based on the quantity of chemically-incorporated diphenols.

The following are some examples of suitable branching agents containing three or more phenolic hydroxyl groups: 2,4-bis-(4-hydroxyphenyl-isopropyl)-phenol, 2,6-bis-(2'-hydroxy-5'-methyl-benzyl)-4- methylphenol, 2-(4-hydroxyphenyl-2-(2,4-dihydroxyphenyl)-propane and 1,4-bis-(4,4'-dihydroxytriphenyl-methyl)-benzene. Other trifunctional compounds include: 2,4-dihydroxybenzoic acid, trimesic acid, cyanuric chloride, 3,3-bis-(4-hydroxyphenyl)-2-oxo-2,3- dihydroindole and 3,3-bis-(4-hydroxy-3-methyl-phenyl)-2-oxo-2,3-dihydroindole.

The branched polycarbonates are prepared by the known methods used for aromatic, thermoplastic polycarbonates namely either transesterification in a solvent-free reaction mixture with diphenylcarbonate or the diphasic interface process with phosgene (see, for example, H. Schnell, Chemistry and Physics of polycarbonates, Polymer Revue, Vol. IX, page 27 et seq, Interscience publishers New York, 1964, and DE-OS 1,570,533, DE-OS 1,595,762, DE-PS 2,500,002, US-PS 3,544,514 and US-RE 27,682).

The reaction conditions for both these methods are well known.

The chain-breaking agents used for the diphasic interface process may be aromatic compounds containing a functional group, such as aromatic acid halides or phenols especially the commonly used phenols, such as p-t-butyl phenol, p-chlorophenol, 2,4,6-tribromophenol or phenol itself. The quantities in which these chain-breakers are used is determined by the molecular weight to which the branched polycarbonates are to be adjusted. They are generally used in quantities of 0.5 to 10.0 mol-%, based on the quantity of diphenols put into the process.

According to the present invention from 0.05 to 15%, by weight, of the UV absorbents (I) are added to the branched polycarbonates. They are incorporated in the polycarbonates by means of conventional mixing apparatus, such as rollers, kneaders or single shaft or multishaft extruders.

Other, conventional additives, such as reinforcing agents and fillers, flame retardants, dyes, pigments and lubricants and mould release agents, may also be added to the polycarbonate.

The present invention therefore relates also to a process of stabilizing of branched, thermoplastic polycarbonates which is characterized in that from 0.05% by weight to 15% by weight of UV-absorbent (I) and optionally reinforcing agents, fillers, flame retardants, dyes, pigments, lubricants and/or mould release agents are incorporated by means of conventional mixing apparatus, such as rollers, kneaders, single shaft extruders or multishaft extruders.

Glass fibres are preferred reinforcing materials.

Polycarbonates which have been stabilized as described above may be worked-up into fibres, films, plates and injection moulded and extruded articles in known manner. Extrusion may be used, for example, for producing solid plates or multiple plates used as panes in the construction of buildings and greenhouses. According to the present invention, branched polycarbonates containing from 0.05 to 1%, by weight, preferably from 0.2 to 0.8%, by weight, of UV absorbent (I) are used for this purpose.

Another application of the polycarbonates stabilized against UV light according to the present invention is the use thereof in the production of multilayered plastics sheets by the (multiple) coextrusion process in which the weight bearing core is a layer of synthetic resin, for example of ABS or straight-chained or branched polystyrene, preferably branched polycarbonate, which is covered on one or both sides with UV absorption layers of branched polycarbonate containing from 1 to 15%, by weight, preferably from 5 to 10%, by weight of the UV absorbent (I).

The UV absorption layer should have a thickness of from 10 to 50 $\mu$m, preferably from 20 to 40 $\mu$m.

A covering layer from 10 to 30 $\mu$m preferably from 10 to 20 $\mu$m, in thickness substantially free from UV absorbent may be applied to the side of the UV absorption layer remote from the core.

Processes and apparatus for single and multiple extrusion have been disclosed in DE-OS 2,832,670.

The application of a UV absorption layer containing a UV absorbent which is volatile at high temperatures has been disclosed in EP-OS 110 238.

The present invention therefore also relates to the use of the branched polycarbonates according to the present invention for the production of sheets or plates, such as solid plates or multiple plates containing from 0.05 to 1%, by weight, preferably from 0.2 to 0.8%, by weight, of hydroxybenzotriazole (I).

The present invention also relates to the use of the present branched polycarbonates for the production of multilayered plastics panels in which the UV absorption layer has a thickness of from 10 to 50 $\mu$m, preferably from 20 to 40 $\mu$m, and the amount of hydroxybenzothiazole (I) in the UV absorption layer is from 1 to 15%, by weight, preferably from 5 to 10%, by weight.

The present invention therefore relates also to a process of preparing multilayered plastic sheets by the (multiple) coextrusion process which is characterized in that the weight bearing core is a layer of thermoplastic synthetic resin which will be covered on one or both sides with an UV absorption layer of branched, thermoplastic polycarbonate containing from 1 to 15% by weight, preferably from 5 to 10 % by weight of the UV-absorbent (I) and having a thickness of from 10 to 50 μm, preferably from 20 to 40 μm, which UV absorption layer(s) is (are) placed in known manner onto the bearing core.

EXAMPLES

I = UV absorbent Tinuvin 350 (of Ciba Geigy)

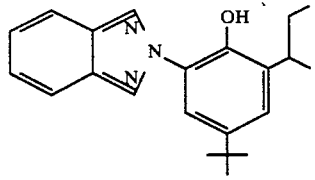

II =

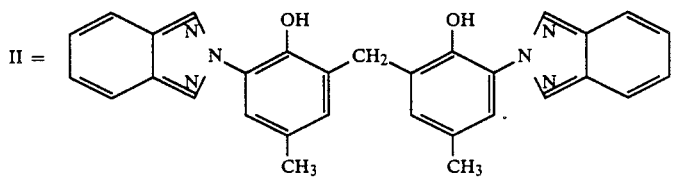

Linear polycarbonate = polycarbonate based on bisphenol A adjusted with phenol as chain-breaker and having a relative solution viscosity of 1.29 (determined at 25° C. on a 0.5% solution in dichloromethane).

Branched polycarbonate = polycarbonate based on bisphenol A branched with 0.3 mol-% (based on the bisphenol) of 3,3-bis-(4-hydroxy-3-methylphenyl)-2-oxo-2,3-dihydroindole and regulated with phenol as chain-breaker, and having a relative solution viscosity of 1.32 (determined at 25° C. on a 0.5% solution in dichloromethane).

0.3%, by weight, of UV absorbent was incorporated in the polycarbonates at 290° C. and 80 revs/min in a two-shaft extruder (ZSK 32, Werner und Pfleiderer) and the extrudate was granulated. Sheets 25 cm in length, 5 cm in width and 1 mm in thickness were produced from this compound in an injection moulding machine ("Idra").

These sheets were weathered in a Weather-o-meter of Atlas USA, using a 6.5 W-Xenon burner at a cycle of 102 minutes exposure to light and 18 minutes spraying with demineralised water under exposure to light. The maximum black sheet temperature was 60±5° C. After 1000 hours of treatment, the sheets were matched up and a modified falling ball test which had been developed on multiple layer sheet on the basis of DIN 53 443 was carried out to determine the toughness under simulated practical conditions. In this test, a penetration body 5 mm in diameter is designed to produce a biaxial stress similar to that of a falling hailstone. The sample bodies placed on a support ring having an internal diameter of 20 mm are struck by a falling mass of 36kg from a height of 0.2 m at room temperature.

The weathered side of the sample body is tested in the pressure zone. The breakage pattern (BB) is described by numbers: 1=splintering, 2=smooth break, 3=tough-brittle, 4=tough.

The yellow value determined according to DIN 6167 is given as the yellowness index (YI).

The results are summarized in the following Table.

| Experiment | UV absorbent | Polycarbonate | Weathering Xenon WOM | | | | Quantity measured |
| | | | 0 h | 1000 h | 2000 h | 3000 h | |
| --- | --- | --- | --- | --- | --- | --- | --- |
| A 1 | I | linear | 3.10 | 4.84 | 10.18 | 9.25 | YI |
| | | | 4 × 4 | 3 × 1/3 | 4 × 4 | 4 × 4 | BB |
| A 2 | II | linear | 4.72 | 5.57 | 10.74 | 8.72 | YI |
| | | | 4 × 4 | 4 × 3 | 4 × 4 | 4 × 4 | BB |
| B 1 | I | branched | 3.67 | 6.30 | 11.64 | 10.84 | YI |
| | | | 4 × 4 | 2 × 1/3/4 | 2 × 3/4 | 2 × 3/2 × 4 | BB |
| B 2 | II | branched | 3.64 | 5.64 | 11.42 | 9.23 | YI |
| | | | 4 × 4 | 1/3/4 | 4 × 4 | 4 × 4 | BB |

The results are as follows:

1. Damage to the linear polycarbonate is not substantially different in the presence of UV absorbent I than in the presence of absorbent II. This applies particularly to the values obtained for long term weathering (2000 h and 3000 h values).

2. Quite different are the weathering results obtained for branched polycarbonates.

When UV absorbent I (conventional) is used, damage is progressive in the course of weathering so that brittle breakage is recorded in half the samples after 2000 and 3000 hours weathering, whereas absorbent II (according to the present invention) provides better protection for the polycarbonate so that the samples are all found to be "tough" in the penetration test.

We claim:

1. A molding composition comprising a branched, thermoplastic polycarbonate and 0.05 to 15% of a hydroxybenzotriazole corresponding to

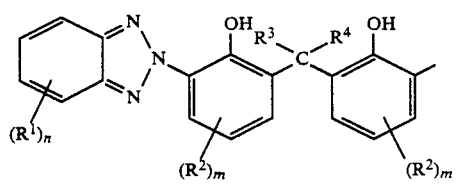

I

-continued

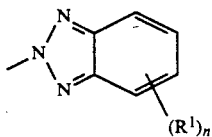

wherein
R[1] and R[2] each independently represents hydrogen, halogen, $C_1$-$C_{10}$ alkyl, $C_5$-$C_{10}$ cycloalkyl, $C_7$-$C_{13}$ aralkyl, $C_6$-$C_{14}$ aryl, -O-R[5] or

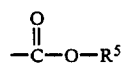

wherein R[5] represents hydrogen or $C_1$-$C_4$ alkyl;
R[3] and R[4] each independently represents hydrogen, $C_1$-$C_4$ alkyl, $C_5$ or $C_6$ cycloalkyl, benzyl or $C_6$-$C_{14}$ aryl;
m represents 1, 2 or 3; and
n represents 1, 2, 3 or 4
said percent being relative to the weight of said composition.

2. A composition as claimed in claim 1 wherein R[1] represents hydrogen, chlorine or methyl; R[2] represents hydrogen, $C_1$-$C_{10}$ alkyl, cyclohexyl, $C_7$-$C_9$ aralkyl, phenyl or naphthyl; R[3] and R[4] each independently represents hydrogen or $C_1$-$C_4$ alkyl; and m and n each represents 1.

3. A composition as claimed in claim 1 wherein R[1], R[3] and R[4] each represents hydrogen; R[2] represents hydrogen or $C_1$-$C_9$ alkyl; and m and n each represents 1.

4. A process for the production of a multilayered sheet which comprises forming at least one layer from a composition as claimed in claim 1 such that the layer is from 10 to 50 μm thick and comprises from 1 to 15%, by weight, of said hydroxybenzotriazole.

5. A process as claimed in claim 4 wherein the layer comprises from 5 to 10%, by weight, of said hydroxybenzotriazole.

6. Process of stabilizing of branched, thermoplastic polycarbonates, characterized in that from 0.05% by weight to 15% by weight of the hydroxybenzotriazole of claim 1 and optionally reinforcing agents, fillers, flame retardants, dyes, pigments, lubricants and/or mould release agents are incorporated by means of conventional mixing apparatus.

7. In the process of producing polycarbonate sheets the improvement comprising molding said sheets from the composition of claim 1 wherein said hydroxybenzotriazole is present in an amount of 0.05 to 1% relative to the weight of said composition.

8. The improvement of claim 7 wherein said hydroxybenzotriazole is present in an amount of 0.2 to 0.8%.

9. In the process for preparing multilayered plastic sheets by co-extrusion the improvement comprising using the molding composition of claim 1 for the preparation of at least one cover layer of a core layer which is prepared from a thermoplastic synthetic resin said cover layer containing about 1 to 15% by weight of the hydroxybenzotriazole of claim 1 said cover layer having a thickness of from about 10 to 50 μm.

* * * * *

UNITED STATES PATENT AND TRADEMARK OFFICE
CERTIFICATE OF CORRECTION

PATENT NO. : 5,001,177

DATED : March 19, 1991

INVENTOR(S) : Winfried Paul et al

It is certified that error appears in the above-identified patent and that said Letters Patent is hereby corrected as shown below:

ON THE TITLE PAGE: at line 2, under "United States Patent", delete "Winfried et al" and insert --Paul et al--.

On the cover page, at line 6, after "Inventors:", delete "Paul Winfried" and insert --Winfried Paul--.

At column 2, line 57, after "diphenols", insert --,--.

At column 2, line 64, delete "Mw" and insert --$\overline{M}_w$--.

At column 2, line 68, after "hydroquinone", insert --,--.

In the sentence bridging columns 2 and 3, at column 3, line 1, after "resorcinol", insert --,--.

At column 3, line 1, delete "4  4'-dihydroxy-diphenyl" and insert --4,4'-dihydroxy-diphenyl,--.

At column 3, line 47, delete "polycarbonates" and insert --Polycarbonates--.

At column 3, line 50, delete "2,500,002" and insert --2,500,092--.

Signed and Sealed this

Thirteenth Day of October, 1992

Attest:

DOUGLAS B. COMER

*Attesting Officer*     *Acting Commissioner of Patents and Trademarks*